T. B. TAYLOR.
HOLLOW SHEET METAL BOLT.
APPLICATION FILED SEPT. 16, 1915.

1,172,406.

Patented Feb. 22, 1916.

Witnesses
Ruth M. H. Koger
Samuel C. Shew

Inventor
Thomas B. Taylor
By Chamberlain & Newman
Attorneys

UNITED STATES PATENT OFFICE.

THOMAS B. TAYLOR, OF STRATFORD, CONNECTICUT.

HOLLOW SHEET-METAL BOLT.

1,172,406.

Specification of Letters Patent.

Patented Feb. 22, 1916.

Application filed September 16, 1915. Serial No. 51,004.

*To all whom it may concern:*

Be it known that I, THOMAS B. TAYLOR, a subject of the King of Great Britain, and resident of Stratford, in the county of Fairfield and State of Connecticut, have invented certain new and useful Improvements in Hollow Sheet-Metal Bolts, of which the following is a specification.

This invention relates to new and useful improvements in bolts and refers particularly to hollow bolts when formed of drawn tubing.

The purpose of the invention is to produce an exceptionally light, yet strong and durable bolt which obviously would be particularly desirable where lightness is required as for the construction of racing cars, flying machines, &c.

It is the special object of my invention to produce a hollow bolt having a shouldered or square head formed of a piece of tubing such for instance as may be drawn from sheet metal blanks; further to construct the bolt so that it will not only be hollow, but will have an opening all the way through it and including an enlarged recess or opening in the head portion; and finally to form the head so that it will be slightly yieldable longitudinally of the bolt as will be later referred to.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Figure 1:
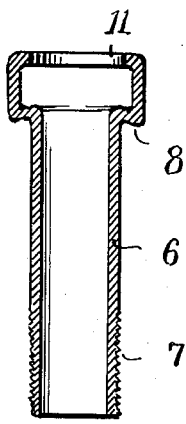
Figure 2:
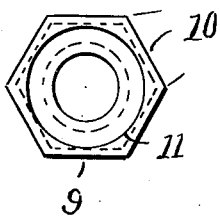
Figure 3:
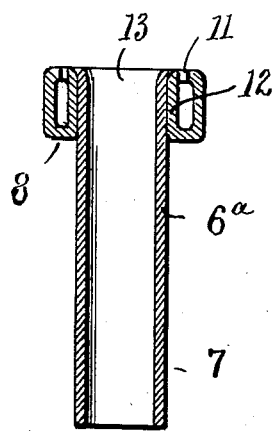
Figure 4:
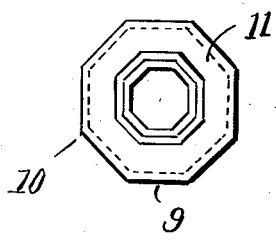
Figure 5:
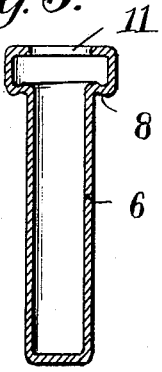

Similar characters of reference denote like or corresponding parts throughout the several figures of the accompanying drawings forming a part of this specification, and upon which:

Figure 1 shows a central vertical longitudinal section through a sheet metal screw bolt constructed in accordance with my invention. Fig. 2 is a top plan view of the same. Fig. 3 shows a modification of the invention. Fig. 4 is a plan view of Fig. 3, and Fig. 5 shows a further form of hollow bolt having its lower end closed and yet formed in accordance with my invention.

As before stated the bolt is made from sheet metal and is first drawn into a longitudinal tube of such a size as may be required to produce a bolt of the required length. The shank 6 of the bolt may be straight or have a slight taper from head to point and its lower end may be open or closed as shown. The periphery of the point may be threaded as shown at 7 for the attachment of a nut, not shown. The head end of the bolt is enlarged and shaped to form a spring or yieldable head and includes an annular shoulder 8 which is disposed outward in the form of an OG curve and in a way to lend yieldability to the head longitudinally of the bolt. This shoulder is disposed in a general right angle direction from the shank of the bolt and forms the underside of the head.

From the foregoing it will be seen that when great pressure is brought to bear against the under side of the head as by tightening a nut upon the shank, the yieldable shoulder will spring thereby forming a tension and grip which will prevent the bolt from turning. The stock for the head is further disposed upward parallel with the center line of the bolt and the sides shaped to form the flat side faces 9 and the vertical corner edge portions 10 in imitation of a shoulder head of any particular style, whether it be a square head having four sides or whether it is a hexagonal head having six sides. The upper edge portion of the tubular stock is deflected inward to form an inwardly disposed annular edge 11 which affords a smooth finish to the top end of the bolt.

In Figs. 3 and 4 I have shown a bolt formed of two sheet metal parts the shank 6ª being formed in one piece and the head in another. The head in this instance is hollow and itis under side forms a shoulder and the peripheral surface is shaped to form the flat side faces in the same manner as illustrated in Figs. 1 and 2. The head, however, is further provided with an inner annular hub 12 into which the upper end 13 of the bolt is tightly fitted. The extreme upper edge of this end 13 of the bolt is then preferably swaged out and turned back upon the upper edge of the hub in a way to prevent the head from pulling off. A bolt made in this way can obviously be made lighter in proportion to its weight than one made by drilling out the center from the inside of solid stock and with the proper tools can also be made very much cheaper.

I do not therefore wish to confine myself to the particular construction shown since the shape of the head may, of course, be varied somewhat or in fact can be made separately as suggested without departing from the feature of a sheet metal bolt as shown having a recessed head that is strong and durable, and possesses the features of construction enumerated in the claims.

Having thus described my invention what I claim and desire to secure by Letters Patent is:—

1. A bolt formed of a single piece of tubing, threaded upon one end portion, and having its other end enlarged and shaped to form a hollow open ended head said head including an extended annular shoulder and flat shouldered side faces arranged parallel with the sides of the bolt.

2. A bolt formed of drawn tubing and including a hollow shank and head, the head portion forming an annular shoulder upon its under side, and parallel side faces with an inturned annular edge.

3. A bolt formed of metal tubing and including a hollow shank, threaded upon one end portion and having a hollow head including an annular yieldable shoulder extended out from the shank and having shouldered side faces arranged parallel with the center of the bolt.

4. A bolt formed of a single piece of tubing, threaded upon one end portion, and having its other end bent to form a hollow open ended head and including an outwardly bent annular shoulder extended out from the shank of the bolt, and side faces and corner edges parallel with the center of the bolt and further shaped to include an inturned annular edge and an open top end.

Signed at Bridgeport in the county of Fairfield and State of Connecticut this 11th day of September A. D., 1915.

THOMAS B. TAYLOR.

Witnesses:
C. M. NEWMAN,
I. L. MOREHOUSE.